United States Patent
Chang

(10) Patent No.: US 7,585,094 B2
(45) Date of Patent: *Sep. 8, 2009

(54) OPTICAL PLATE WITH LIGHT DIFFUSION LAYER AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 18 days.

This patent is subject to a terminal disclaimer.

(21) Appl. No.: 11/566,836

(22) Filed: Dec. 5, 2006

(65) Prior Publication Data

US 2008/0043493 A1 Feb. 21, 2008

(30) Foreign Application Priority Data

Aug. 18, 2006 (CN) .................. 2006 1 0062206

(51) Int. Cl.
*F21V 5/00* (2006.01)
(52) U.S. Cl. .................. 362/332; 362/619; 362/627
(58) Field of Classification Search .................. 362/619, 362/625, 632, 29, 30, 240, 246, 330, 607, 362/608, 612, 613, 618, 624, 627, 332; 385/31, 385/129, 901
See application file for complete search history.

(56) References Cited

U.S. PATENT DOCUMENTS

| | | | | |
|---|---|---|---|---|
| 3,351,753 A | * | 11/1967 | Berger | 362/327 |
| 4,345,308 A | * | 8/1982 | Mouyard et al. | 362/332 |
| 5,377,084 A | * | 12/1994 | Kojima et al. | 362/618 |
| 5,971,559 A | * | 10/1999 | Ishikawa et al. | 362/625 |
| 6,913,365 B2 | | 7/2005 | Masaki | |
| 6,979,112 B2 | | 12/2005 | Yu | |
| 7,255,456 B2 | | 8/2007 | Yao | |
| 7,255,462 B2 | * | 8/2007 | Tseng | 362/330 |
| 2006/0001793 A1 | | 1/2006 | Nitto | |
| 2006/0104084 A1 | * | 5/2006 | Amemiya et al. | 362/561 |
| 2006/0109682 A1 | * | 5/2006 | Ko et al. | 362/607 |
| 2007/0114555 A1 | | 5/2007 | Takemoto | |
| 2007/0133095 A1 | | 6/2007 | Schenke | |
| 2007/0171671 A1 | | 7/2007 | Kurokawa | |
| 2007/0263408 A1 | * | 11/2007 | Chua | 362/612 |
| 2007/0263412 A1 | | 11/2007 | Lee | |
| 2007/0285785 A1 | | 12/2007 | Lin | |
| 2008/0030994 A1 | | 2/2008 | Chang | |
| 2008/0037274 A1 | | 2/2008 | Chang | |
| 2008/0037281 A1 | | 2/2008 | Chang | |
| 2008/0043455 A1 | | 2/2008 | Chang | |

* cited by examiner

*Primary Examiner*—John A Ward
(74) *Attorney, Agent, or Firm*—Clifford O. Chi

(57) ABSTRACT

An exemplary optical plate (20) includes a transparent plate (21) and a light diffusion layer (22). The transparent plate includes a light output surface (212), a light input surface (211) opposite to the light output surface, and a plurality of elongated recessed portions (213) formed at the light input surface. The light diffusion layer is coated in the elongated recessed portions. The light diffusion layer and the light input surface cooperatively define a flat surface. A backlight module using the present optical plate is also provided. The present backlight module using the optical plate can have a thin body with a good optical performance.

17 Claims, 8 Drawing Sheets

OPTICAL PLATE WITH LIGHT DIFFUSION LAYER AND BACKLIGHT MODULE USING THE SAME

CROSS-REFERENCE TO RELATED APPLICATIONS

This application is one of four co-pending U.S. patent applications, which is; application Ser. No. 11/550,379, filed on Oct. 17, 2006, and entitled "OPTICAL PLATE AND BACKLIGHT MODULE USING THE SAME"; application Ser. No. 11/557,914, filed on Nov. 8, 2006, and entitled "OPTICAL PLATE AND BACKLIGHT MODULE USING THE SAME"; application Ser. No. 11/565,575, filed on Nov. 30, 2006, and entitled "OPTICAL PLATE WITH DIFFUSION LAYER AND BACKLIGHT MODULE USING THE SAME"; application Ser. No. 11/566,836, filed on Dec. 5, 2006, and entitled "OPTICAL PLATE WITH DIFFUSION LAYER AND BACKLIGHT MODULE USING THE SAME". In the co-pending applications, the inventors are Shao-Han Chang. The co-pending applications have the same assignee as the present application. The disclosure of the above identified application is incorporated herein by reference.

This application is related to a U.S. patent application Ser. No. 11/565,575 entitled "OPTICAL PLATE WITH LIGHT DIFFUSION LAYER AND BACKLIGHT MODULE USING THE SAME", recently filed with the same assignee as the instant application. The disclosure of the above identified application is incorporated herein by reference.

BACKGROUND OF THE INVENTION

1. Field of the Invention

The present invention relates to optical plates, and more particularly to an optical plate typically used in a backlight module, the backlight module being used in apparatuses such as a liquid crystal display (LCD).

2. Discussion of the Related Art

In a liquid crystal display device, liquid crystal is a substance that does not itself radiate light. Instead, the liquid crystal relies on light received from a light source, in order that the liquid crystal can provide displaying of images and data. In the case of a typical liquid crystal display device, a backlight module powered by electricity supplies the needed light.

FIG. 7 represents a typical direct type backlight module 10. The backlight module 10 includes a housing 11, a plurality of lamp tubes 12, a light diffusion plate 13, a light diffusion sheet 14, and a prism sheet 15. The housing 11 includes a base 111, and a plurality of sidewalls 113 extending from a periphery of the base 111. Top ends of the sidewalls 113 cooperatively define an opening 112 therebetween. The light diffusion plate 13, the light diffusion sheet 14, and the prism sheet 15 are stacked in that order on the housing 11 above the opening 112. The lamp tubes 12 are positioned in the housing 11 under the light diffusion plate 13. Light rays emitted from the lamp tubes 12 are substantially diffused in the light diffusion plate 13, and finally surface light rays are output from the prism sheet 15.

However, to enhance the uniformity of light rays output by the backlight module 10, there must be a certain space between the light diffusion plate 13 and the lamp tubes 12. This space eliminates potential dark strips that may otherwise occur due to the reduced intensity of light between adjacent lamp tubes 12. Therefore the backlight module 10 may be unduly thick, and the overall intensity of the output light rays (luminance) may be reduced. Alternatively, the light diffusion plate 13 can be constructed to have sufficient thickness to be able to thoroughly diffuse light rays passing therethrough. In such case, the thickness is typically required to be in the range of about 2 to 3 centimeters.

In addition, the light diffusion plate 13 is typically manufactured by uniformly dispersing a plurality of light diffusion particles 132 into a transparent resin matrix material 131. Since numerous light rays are diffused by the light diffusion particles 132 a number of times in the light diffusion plate 13, an amount of light energy is lost, and a brightness of light output by the backlight module 10 is reduced.

Furthermore, the light diffusion plate 13, the light diffusion sheet 14, and the prism sheet 15 are in contact with each other, but with a plurality of air pockets existing at the boundaries therebetween. When the backlight module 10 is in use, light rays pass through the air pockets, and some of the light rays undergo total reflection at one or another of the corresponding boundaries. Thus the light energy utilization ratio of the backlight module 10 is reduced.

What is needed, therefore, is a new optical plate and a backlight module using the optical plate that can overcome the above-mentioned shortcomings.

SUMMARY

An optical plate according to a preferred embodiment includes a transparent plate and a light diffusion layer. The transparent plate includes a light output surface, a light input surface opposite to the light output surface, and a plurality of elongated recessed portions formed at the light input surface. The light diffusion layer is coated in the light input surface and the elongated recessed portions such that the light diffusion layer and the light input surface cooperatively define a flat surface. The light diffusion layer includes transparent resin matrix material, and first light diffusion particles and second light diffusion particles each dispersed in the transparent resin matrix material uniformly. A refractive index of the second light diffusion articles is greater than that of the first light diffusion particles.

A backlight module according to a preferred embodiment includes a housing, a plurality of linear light sources, and an optical plate. The same optical plate as described in the previous paragraph is employed in this embodiment. The housing includes a base and a plurality of sidewalls extending from the base, the base and the sidewalls cooperatively forming an opening. The optical plate is positioned on the housing. The linear light sources in the receiving cavity underneath the optical plate are positioned in one-to-one correspondence with the elongated recessed portions.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
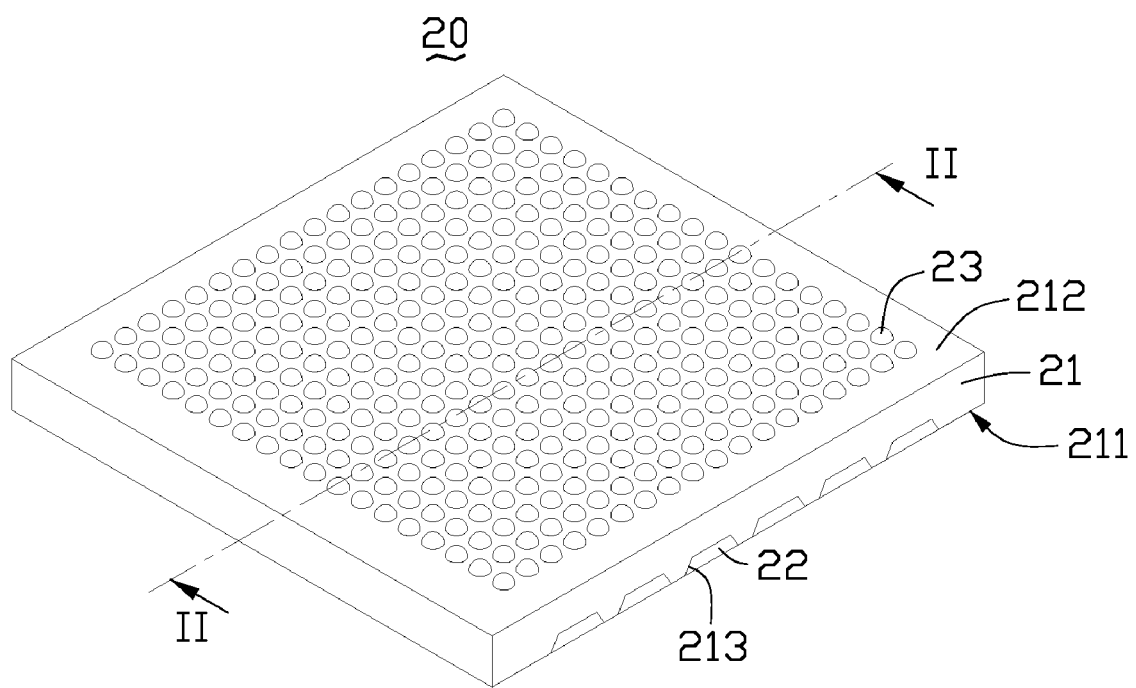
FIG. 1 is an isometric view of an optical plate according to a first preferred embodiment of the present invention, the optical plate having a transparent plate and a light diffusion layer.
Figure 2:
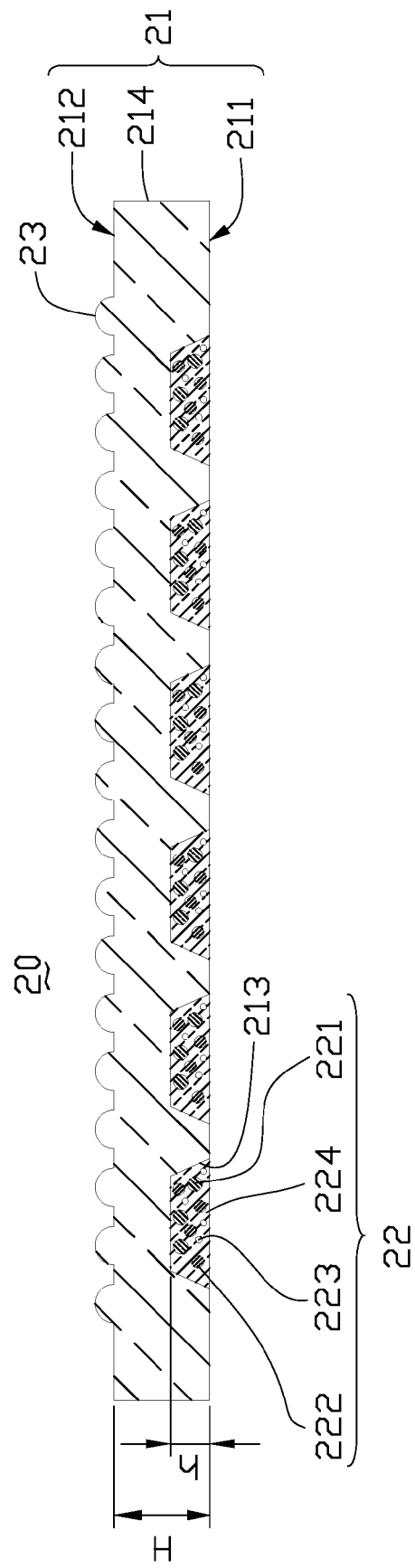
FIG. 2 is an enlarged, cross-sectional view of the optical plate of FIG. 1 taken along line II-II thereof.
Figure 3:
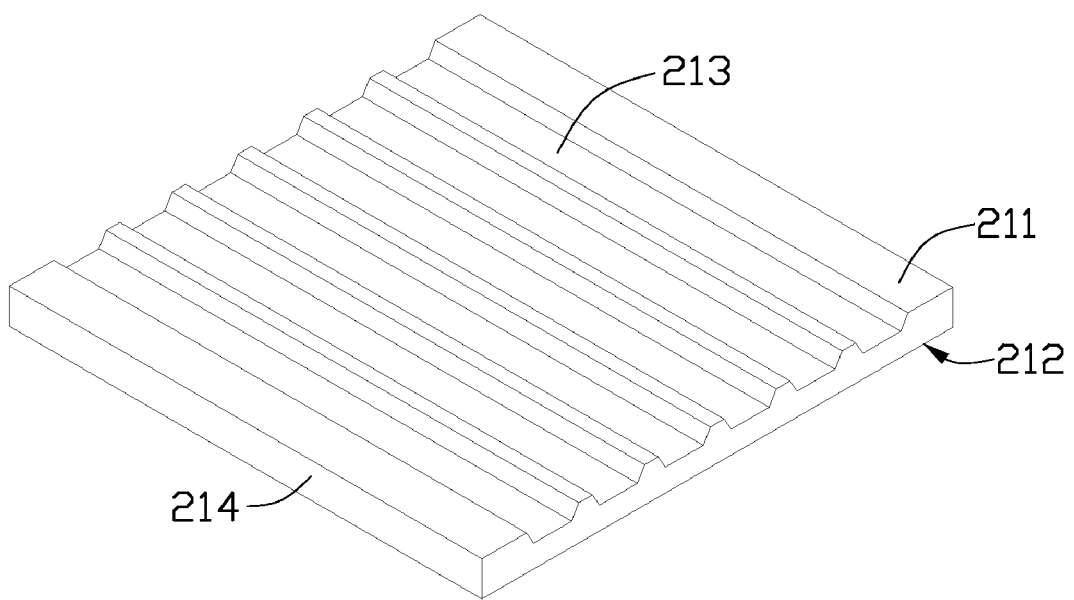
FIG. 3 is an isometric, inverted view of the transparent plate of the optical plate of FIG. 1.

Referring to FIGS. 1 through 3, an optical plate 20 in accordance with a first preferred embodiment of the present invention is shown. The optical plate 20 includes a transparent plate 21 and a light diffusion layer 22. The transparent plate 21 includes a light input surface 211, a light output surface 212 opposite to the light input surface 211, and a plurality of elongated recessed portions 213 formed at the light input surface 211. The light diffusion layer 22 is coated in the elongated recessed portions 213. The light diffusion layer 22 is discontinuous, and is constituted by a group of separate coplanar portions. The light diffusion layer 22 and the light input surface 211 cooperatively define a single flat surface at a bottom of the transparent plate 21. The light output surface 212 is a flat surface. A thickness H of the transparent plate 21 is configured to be in the range from 1.5 millimeters to 3.0 millimeters. The transparent plate 21 can be made of material selected from the group consisting of polycarbonate (PC), polymethyl methacrylate (PMMA), polystyrene (PS), copolymer of methylmethacrylate and styrene (MS), and any suitable combination thereof.

Each elongated recessed portion 213 extends along a direction parallel to a side surface 214 of the optical plate 20. Each elongated recessed portion 213 has one of the following cross-sections taken along a direction perpendicular to the side surface 214 and the light output surface 212: triangular, trapezoidal, arcuate, or arc-shaped. In this embodiment, each elongated recessed portion 213 has an isosceles trapezoidal cross-section. In consideration of light diffusing effects, the ratio of a depth h of each elongated recessed portion 213 to the thickness H of the transparent plate 21 is preferably less than 0.3. Thus, the depth h is configured to be preferably in the range from about 0.45 to about 0.9 millimeters.

The light diffusion layer 22 includes transparent resin matrix material 224 in an amount of 5 to 90 percent by weight, and first and second light diffusion particles 221 and 222 in a combined amount of 10 to 95 percent by weight. The first light diffusion particles 221 and second light diffusion particles 222 are respectively dispersed into the transparent resin matrix material 224 uniformly. A ratio by weight of the first light diffusion particles 221 to the second light diffusion particles 222 is in the range from 5 to 100. The light diffusion layer 22 is manufactured by solidifying a varnish into which the first and second light diffusion particles 221, 222 have been dispersed. The varnish can be selected from the group consisting of acrylic varnish, acrylic amine varnish, epoxy resin varnish, and any suitable combination thereof. Accordingly, the transparent resin matrix material 224 may be one of acrylic, acrylic amine, epoxy resin, and any suitable combination thereof.

A refractive index of the second light diffusion particles 222 is larger than that of the first light diffusion particles 221. The refractive index of the first light diffusion particles 221 is in the range from about 1.4 to about 1.7. The refractive index of the second light diffusion particles 222 is larger than about 2.0, and is preferably selected to be in the range from about 2.0 to about 2.8. A diameter of each of the first light diffusion particles 221 is larger than that of each of the second light diffusion particles 222. The diameter of the first light diffusion particles 221 is in the range from about 1 micron to 500 microns, and the diameter of the second light diffusion particles 222 is in the range from about 0.01 microns to about 1 micron.

The first light diffusion particles 221 may be selected from the group consisting of polystyrene (PS) particles, polycarbonate (PC) particles, styrene acrylonitrile copolymer particles, polypropylene particles, polymethyl methacrylate (PMMA) particles, glass beads, silicon dioxide ($SiO_2$) particles, quartz particles, and any combination thereof. The second light diffusion particles 222 may be selected from the group consisting of titanium dioxide ($TiO_2$) particles, barium sulfate ($BaSO_4$) particles, zinc sulfide (ZnS) particles, zinc oxide (ZnO) particles, antimony oxide ($Sb_2O_3$ or $Sb_2O_5$) particles, calcium carbonate ($CaCO_3$) particles, and any combination thereof.

Figure 4:
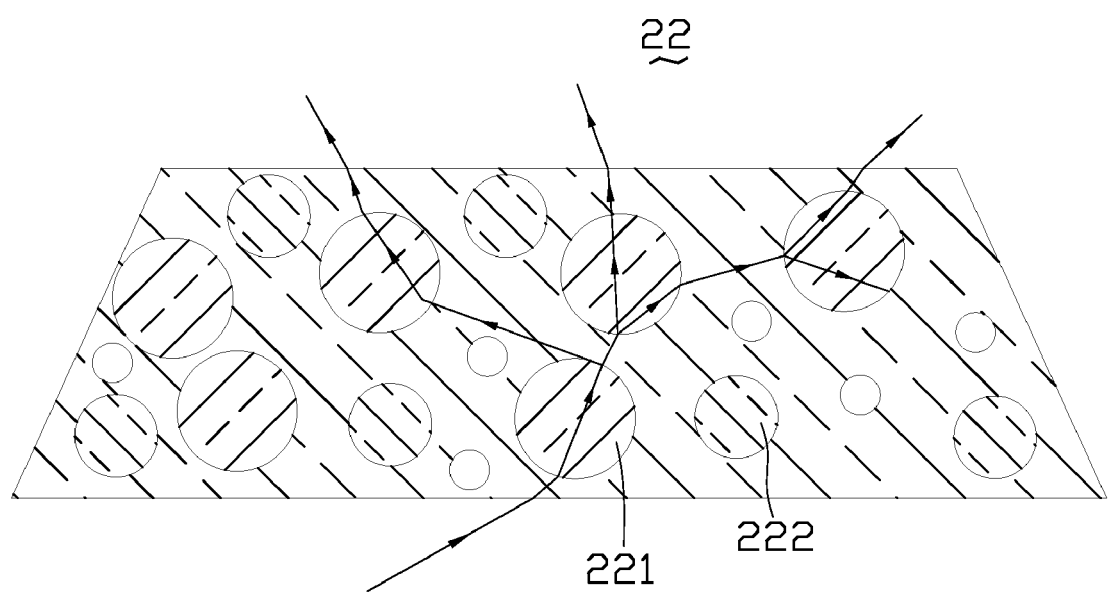
FIG. 4 is an enlarged view of one part of the light diffusion layer of the optical plate of FIG. 2, showing a light ray being diffused at first light diffusion particles within the light diffusion layer.
Figure 5:
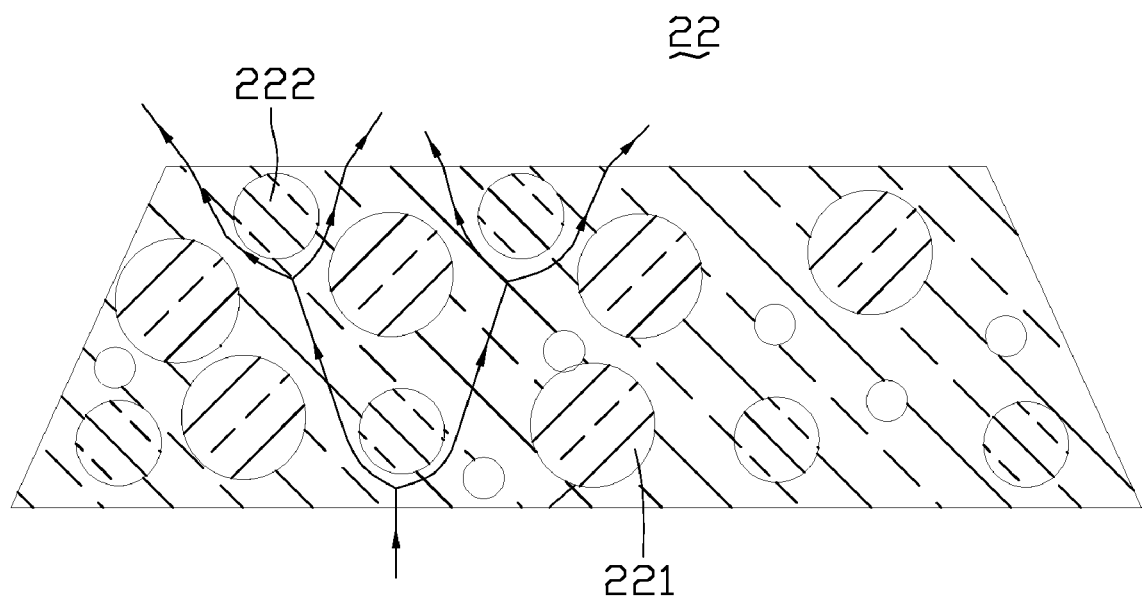
FIG. 5 is similar to FIG. 4, but showing a different light ray being reflected and diffracted at second light diffusion particles within the light diffusion layer.

Referring to FIG. 4, the first light diffusion particles 221 can substantially diffuse light rays passing through the light diffusion layer 22. Referring to FIG. 5, the second light diffusion particles 222 can further diffract and reflect the light rays due to their smaller sizes and larger refractive index compared to the first light diffusion particles 221. Thus the light diffusion layer 22 has a good light diffusion capability with the cooperatively effects of the first and second light diffusion particles 221 and 222. Accordingly, the light diffusion layer 22 of the optical plate 20 may be configured to be very thin, with the optical plate 20 still being able to achieve uniform light diffusion.

In this embodiment, the light diffusion layer 22 further includes a plurality of fluorescent particles 223 uniformly dispersed into the transparent resin matrix material 224 amongst the first and second light diffusion particles 221, 222. A ratio by weight of the fluorescent particles 223 to the first light diffusion particles 221 is preferably less than 1 percent. When ultraviolet rays from one or more external light sources irradiate the fluorescent particles 223, a significant amount of the ultraviolet rays is converted into visible light and infrared light. Therefore, the rate of utilization of light energy of a backlight module using the optical plate 20 is increased.

Referring to FIGS. 1 and 2, the optical plate 20 further includes a plurality of hemispherical protrusions 23 formed on the light output surface 212 of the transparent plate 21. The hemispherical protrusions 23 are discrete from each other, and are arranged in a matrix. A diameter of each hemispherical protrusion 23 is configured to be in the range from about 10 microns to about 500 microns. The transparent plate 21 and the hemispherical protrusions 23 can be integrally manufactured by injection molding. When the optical plate 20 is utilized in a backlight module, light rays from lamp tubes (not shown) enter the optical plate 20. The light rays are substantially diffused in the light diffusion layer 22 of the optical plate 20. Many or most of the light rays are condensed by the hemispherical protrusions 23 of the optical plate 20 before they exit the light output surface 212. Thereby, a brightness of the backlight module is increased.

In an alternative embodiment, prism lens structures may be foamed on the light output surface 212 of the transparent plate 21 of the optical plate 20 instead of the hemispherical protrusions 23. The prism lens structures can be configured for increasing the brightness of a corresponding backlight module. Further, the optical plate 20 is not limited to the above-described embodiments. For example, referring to FIGS. 8(a)-8(e), the optical plate 20 may further or alternatively include other suitable brightness enhancement structures formed at the light output surface 212 thereof, such as hemispherical grooves 24, V-shaped protrusions 25, V-shaped grooves 26, arc-shaped protrusions 27, arc-shaped grooves 28, and the like.

When the optical plate 20 is used in a backlight module, the optical plate 20 may replace a light diffusion plate and prism sheet combination that would ordinarily be used. Therefore, air pockets that would ordinarily exist in the backlight module are eliminated, and loss of light energy in the backlight module is reduced. In addition, because the single optical plate 20 can be used in place of both a light diffusion plate and a prism sheet, the cost of the backlight module is reduced.

Figure 6:
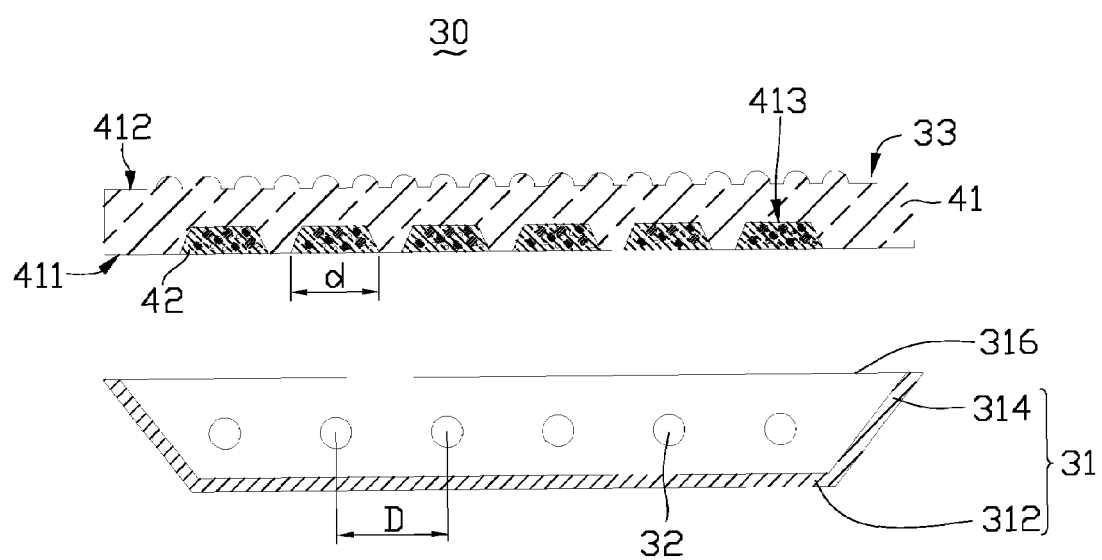
FIG. 6 is an exploded, cross-sectional view of a backlight module according to a second preferred embodiment of the present invention.
Figure 7:
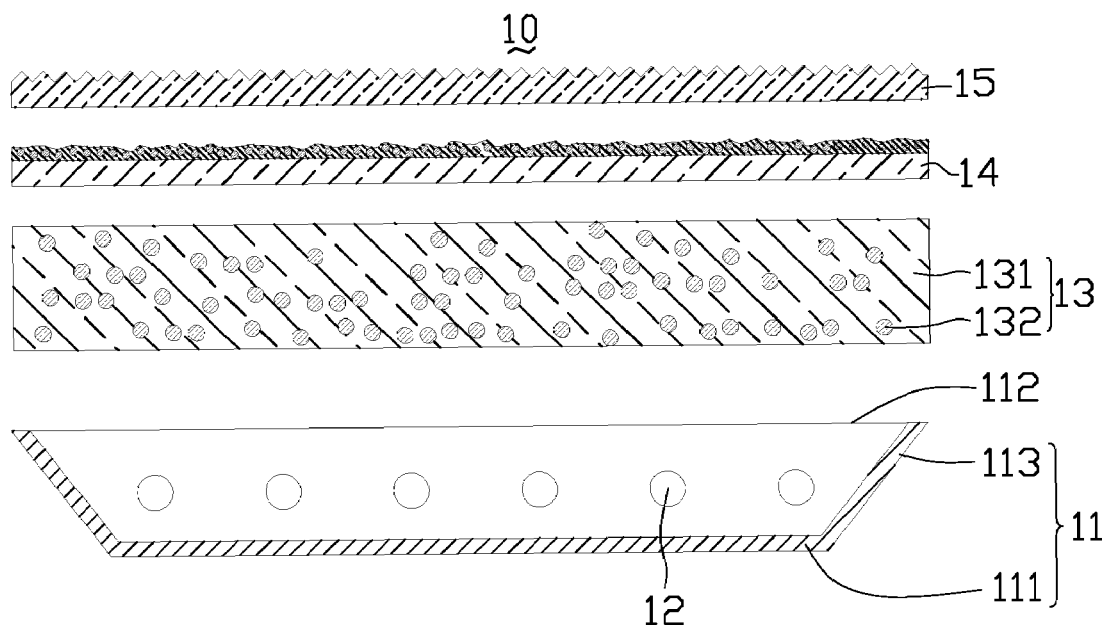
FIG. 7 is an exploded, cross-sectional view of a conventional backlight module.
Figure 8:
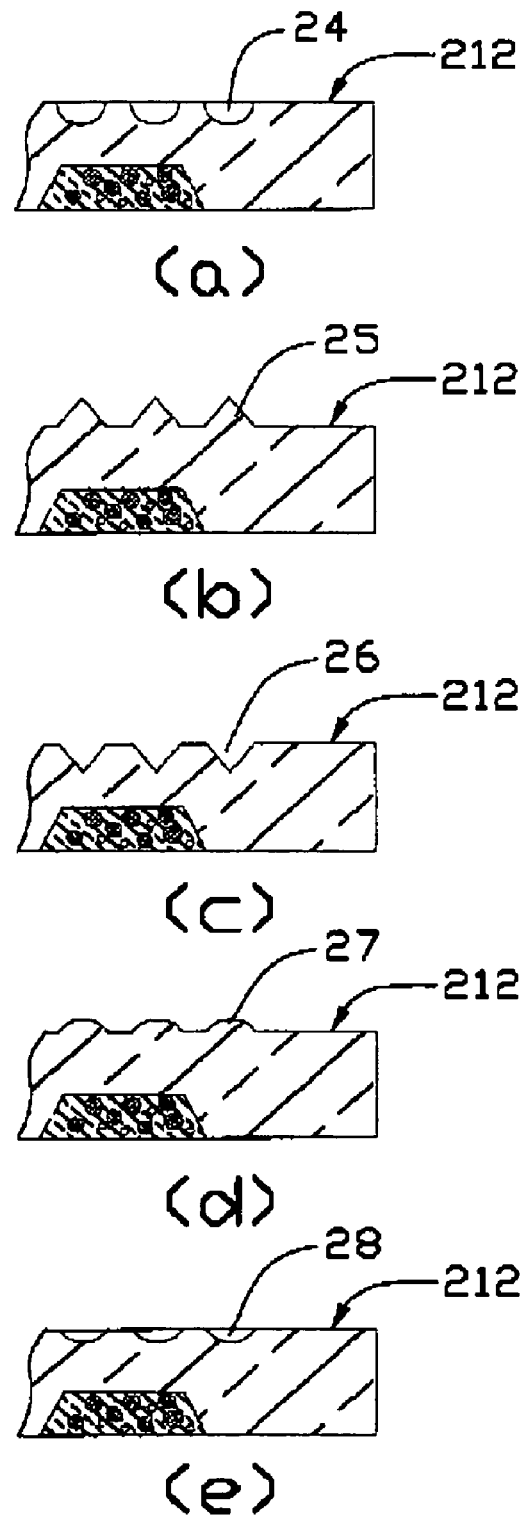
FIGS. 8(a) to 8(e) are partially, side cross-sectional views of five optical plates in accordance with third to seventh embodiments of the present invention.

Referring to FIG. 6, a backlight module 30 in accordance with a second preferred embodiment of the present invention is shown. The backlight module 30 includes a housing 31, a plurality of cold cathode fluorescent lamps 32, and an optical plate 33. The housing 31 includes a base 312, and a plurality of sidewalls 314 extending from a periphery of the base 312. Top ends of the sidewalls 314 cooperatively define an opening 316 therebetween. The optical plate 33 is positioned on the housing 31 above the opening 316.

The optical plate 33 is substantially the same as the optical plate 20 of the first preferred embodiment, and includes a transparent plate 41 and a light diffusion layer 42. The transparent plate 41 includes a light output surface 412, a light input surface 411 opposite to the light output surface 412, and a plurality of elongated recessed portions 413 formed at the light input surface 411. The light diffusion layer 42 is coated in the elongated recessed portions 413. The light diffusion layer 42 and the light input surface 411 cooperatively define a single flat surface at a bottom of the transparent plate 41. The cold cathode fluorescent lamps 32 are regularly arranged on the base 312 in one-to-one correspondence with the elongated recessed portions 413 of the optical plate 33. A largest width d of each elongated recessed portion 413 is configured to be equal to or greater than that of the corresponding cold cathode fluorescent lamp 32. Further, said width d is less than a pitch D between each two adjacent cold cathode fluorescent lamps 32. Light rays emitted from the cold cathode fluorescent lamps 32 are substantially diffused in the optical plate 33, and finally uniform surface light rays are output from the optical plate 33.

Because the cold cathode fluorescent lamps 32 are positioned in one-to-one correspondence with the elongated recessed portions 413, many or most light rays that reach portions of the optical plate 33 directly above the cold cathode fluorescent lamps 32 first pass through the corresponding portions of the light diffusion layer 42. Thus, the optical plate 33 above the cold cathode fluorescent lamps 32 has relatively low illumination. Accordingly, a distance from the cold cathode fluorescent lamps 32 to the optical plate 33 may be configured to be very short, with little or no risk of dark strips occurring due to reduced intensity of input light corresponding to spaces between adjacent cold cathode fluorescent lamps 32. Accordingly, the backlight module 30 can have a thin configuration while still providing good, uniform optical performance. It is to be understood that the cold cathode fluorescent lamps 32 can be replaced by other suitable linear light sources.

Finally, while particular embodiments have been described above, the descriptions are illustrative of principles of the invention and are not to be construed as limiting the invention. Various modifications can be made to the embodiments by those skilled in the art without departing from the true spirit and scope of the invention as defined by the appended claims.

What is claimed is:

1. An optical plate comprising:
a transparent plate portion having:
a light output surface,
a light input surface opposite to the light output surface, and
a plurality of elongated recessed portions formed at the light input surface, and
a light diffusion layer coated in the elongated recessed portions such that the light diffusion layer and the light input surface cooperatively define a single flat surface, wherein the light diffusion layer comprises transparent resin matrix material, and first light diffusion particles and second light diffusion particles each dispersed in the transparent resin matrix material uniformly, and a refractive index of the second light diffusion particles is greater than that of the first light diffusion particles.

2. The optical plate according to claim 1, wherein each elongated recessed portion extends along a direction parallel to one side surface of the optical plate.

3. The optical plate according to claim 2, wherein each elongated recessed portion has one of the following cross-sections taken along a direction perpendicular to the side surface and the light output surface: triangular, trapezoidal, arcuate, or arc-shaped.

4. The optical plate according to claim 1, wherein the refractive index of the first light diffusion particles is in the range from about 1.4 to about 1.7, and the refractive index of the second light diffusion particles is larger than about 2.0.

5. The optical plate according to claim 1, wherein the light diffusion layer comprises the transparent resin matrix material in an amount of 5 to 90 percent by weight, and the first and second light diffusion particles in a combined amount of 10 to 95 percent by weight, and a ratio by weight of the first light diffusion particles to the second light diffusion particles is in the range from 5 to 100.

6. The optical plate according to claim 1, wherein the first light diffusion particles are selected from the group consisting of polystyrene particles, polycarbonate particles, styrene acrylonitrile copolymer particles, polypropylene particles, polymethyl methacrylate particles, glass beads, silicon dioxide particles, quartz particles, and any combination thereof.

7. The optical plate according to claim 1, wherein the second light diffusion particles are selected from the group consisting of titanium dioxide particles, barium sulfate particles, zinc sulfide particles, zinc oxide particles, antimony oxide particles, calcium carbonate particles, and any combination thereof.

8. The optical plate according to claim 1, wherein the light diffusion layer further comprises a plurality of fluorescent particles dispersed in the transparent resin matrix material uniformly, and a ratio by weight of the fluorescent particles to the first light diffusion particles is less than 1 percent.

9. The optical plate according to claim 1, further comprising a plurality of brightness enhancement structures formed at the light output surface of the transparent plate portion.

10. The optical plate according to claim 9, wherein the brightness enhancement structures comprise items selected from the group consisting of hemispherical protrusions, hemispherical grooves, V-shaped protrusions, V-shaped grooves, arc-shaped protrusions, and arc-shaped grooves.

11. The optical plate according to claim 1, wherein the transparent plate portion is made from material selected from the group consisting of polycarbonate, polymethyl methacrylate, polystyrene, copolymer of methylmethacrylate and styrene, and any combination thereof.

12. The optical plate according to claim 11, wherein a thickness of the transparent plate portion is in the range from 1.5 millimeters to 3.0 millimeters, and a ratio of a largest depth of each elongated recessed portion to the thickness of the transparent plate portion is less than 0.3.

13. A backlight module comprising:
a housing having a base and a plurality of sidewalls extending from the base, top ends of the sidewalls cooperatively forming an opening;
an optical plate disposed on the housing above the opening, the optical plate comprising a light output surface, a light input surface opposite to the light output surface, a plurality of elongated recessed portions formed at the light input surface, and a light diffusion layer coated in the elongated recessed portions such that the light diffusion layer and the light input surface cooperatively define a single flat surface, wherein the light diffusion layer comprises transparent resin matrix material, and first light diffusion particles and second light diffusion particles each dispersed in the transparent resin matrix material uniformly, and a refractive index of the second light diffusion particles is greater than that of the first light diffusion particles; and
a plurality of linear light sources in the housing under the optical plate, the linear light sources positioned in one-to-one correspondence with the elongated recessed portions.

14. The backlight module according to claim 13, wherein each elongated recessed portion extends along a direction parallel to one side surface of the optical plate.

15. The backlight module according to claim 14, wherein each elongated recessed portion has one of the following cross-sections taken along a direction perpendicular to the side surface and the light output surface: triangular, trapezoidal, arcuate, or arc-shaped.

16. The backlight module according to claim 13, wherein the refractive index of the first light diffusion particles is in the range from about 1.4 to about 1.7, and the refractive index of the second light diffusion particles is larger than about 2.0.

17. The backlight module according to claim 13, wherein the light diffusion layer comprises the transparent resin matrix material in an amount of 5 to 90 percent by weight, the first and second light diffusion particles in a combined amount of 10 to 95 percent by weight, a ratio by weight of the first light diffusion particles to the second light diffusion particles being in the range from 5 to 100.

* * * * *